(12) United States Patent
Walker et al.

(10) Patent No.: US 6,805,290 B2
(45) Date of Patent: Oct. 19, 2004

(54) PROCESS AND PRODUCT FOR ENFORCING PURCHASE AGREEMENTS

(75) Inventors: Jay S. Walker, Ridgefield, CT (US); Andrew S. Van Luchene, New York, NY (US); Jose A. Suarez, Fairfield, CT (US); Magdalena M. Fincham, Norwalk, CT (US); Dean P. Alderucci, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 10/100,564

(22) Filed: Mar. 15, 2002

(65) Prior Publication Data

US 2002/0130179 A1 Sep. 19, 2002

Related U.S. Application Data

(60) Provisional application No. 60/276,199, filed on Mar. 15, 2001.

(51) Int. Cl.[7] .............................................. G06K 15/00
(52) U.S. Cl. ........................ 235/383; 235/379; 235/380; 235/381; 235/382; 235/385
(58) Field of Search ................................. 235/383, 379, 235/380, 381, 382, 385, 470, 493; 705/14, 10, 26, 400

(56) References Cited

U.S. PATENT DOCUMENTS

| | | | | |
|---|---|---|---|---|
| 3,937,929 A | * | 2/1976 | Knauer | 235/435 |
| 4,799,156 A | * | 1/1989 | Shavit et al. | 705/26 |
| 4,882,675 A | * | 11/1989 | Nichtberger et al. | 705/14 |
| 4,949,256 A | * | 8/1990 | Humble | 705/14 |
| 5,185,695 A | * | 2/1993 | Pruchnicki | 705/14 |
| 5,642,485 A | * | 6/1997 | Deaton et al. | 705/14 |
| 5,873,069 A | * | 2/1999 | Reuhl et al. | 705/20 |
| 6,014,635 A | * | 1/2000 | Harris et al. | 705/14 |
| 6,193,154 B1 | * | 2/2001 | Phillips et al. | 235/381 |
| 6,321,208 B1 | * | 11/2001 | Barnett et al. | 705/14 |
| 6,321,984 B1 | * | 11/2001 | McCall et al. | 235/381 |
| 6,336,098 B1 | * | 1/2002 | Fortenberry et al. | 705/14 |
| 6,405,175 B1 | * | 6/2002 | Ng | 705/14 |
| 6,467,686 B1 | * | 10/2002 | Guthrie et al. | 235/383 |

FOREIGN PATENT DOCUMENTS

| | | |
|---|---|---|
| JP | 10214284 | 8/1998 |
| WO | WO 97/16797 | 5/1997 |
| WO | WO 97/23838 | 7/1997 |
| WO | WO 98/21713 | 5/1998 |

OTHER PUBLICATIONS

Senior, Electronic quantity purchasing system. Mar. 7, 2002. U.S. patent application Publication.*
Delivery & In–Store Pickup at www.bestbuy.com/InfoCenter/Delivery/index.asp?m=937.*
Naik, Gautam, "In Digital Dorm, Click on Return for Soda", The Wall Street Journal Online, undated.
Brochure: "Reaching Out In New Directions", First Data Corporation, Merchant Service, undated.
"FAQ: CSH Coke Machine Information", FAQ, May 23, 1994, vol. 1.2, (http//www cs uu nl/wais/html/na–dir/csh–coke–machine–info html).

(List continued on next page.)

Primary Examiner—Michael G. Lee
Assistant Examiner—Kimberly D. Nguyen
(74) Attorney, Agent, or Firm—Dean P. Alderucci (57) ABSTRACT

Systems and methods are provided for establishing online a buyer price for a first plurality of products. The buyer price being lower than a retail price of the first plurality of products, the first plurality of products to be picked up during a subsequent transaction at a retailer. Thereafter, a second plurality of products which the buyer has actually received during the subsequent transaction is determined. A penalty may be assessed if the first and second plurality of products do not correspond.

18 Claims, 9 Drawing Sheets

OTHER PUBLICATIONS

Website: "Groceries Online", (http//www groceries–online com/), Copyright 1996 Groceries Online, Inc.

Website: "Computer Science House: Projects: Drink Machine", (http//www csh rit edu/proj/drink html), download date: Jan. 29, 1998.

Fallon, James, "Safeway Puts Ordering into Customers' Palms", Executive Technology, Jan. 1999.

Website: "SaveSmart—How SaveSmart Works for Consumers", (http//www savesmart com/consumer/consumer_how-itworks html), download date: Jan. 17, 1999.

Website: "welcome to planet U, providers of U–pons—Internet Coupons", (http//www planetu com/), download date: Mar. 16, 1999.

Lazarus, David, "E–Commerce, Japanese Style", Wired Online, (http//www wired com), Jun. 7, 1999.

"Wal–Mart vs. Amazon: The fight begins", Yahoo News, (http//www yahoo com), Jun. 9, 1999.

"Circuit City to Integrate E–Commerce With Store Shopping: Retailer's E–Superstore—www Circuitcity com—to Open in Jul.", PR Newswire, Jun. 15, 1999, Section: Financial News.

Frederick, James, "Walgreens gears for opening of its own Internet pharmacy", Drug Store News, Jul. 19, 1999, vol. 9, No. 7.

"Internet Wine Gift Company Offers Answer to Recent Legislation", Source: Send.com, Aug. 10, 1999.

* cited by examiner

| CUSTOMER IDENTIFIER 305 | CUSTOMER NAME 310 | CUSTOMER CONTACT INFORMATION 315 | CUSTOMER PAYMENT INFORMATION 320 |
|---|---|---|---|
| C-111 | SUSAN JONES | 123 MAIN ST. TOWN, USA | 1111-2222-3333-4444 |
| C-112 | TOM SMITH | TSMITH@ISP.NET | 2222-4444-6666-8888 |
| C-113 | DEAN GREENE | (111) 555-2222 | 3333-6666-9999-1111 |

FIG. 3

| PRODUCT IDENTIFIER 405 | PRODUCT DESCRIPTION 410 | APPLICABLE REBATE 1 415 | APPLICABLE REBATE N 420 |
|---|---|---|---|
| P-0010 | 8 OZ. "BRAND A" TOOTHPASTE | $0.30 | $0.35 |
| P-0011 | 10 OZ. "BRAND B" TOOTHPASTE | $0.50 | $0.40 |
| P-0053 | "BRAND Y" FROZEN ORANGE JUICE | $0.40 | $1.00 |
| P-0054 | "BRAND Y" FRESH ORANGE JUICE | $0.55 | $0.55 |
| P-0105 | "BRAND C" 6-PACK COLA | $0.45 | $0.45 |
| P-0106 | "BRAND P" 2L DIET COLA | $0.05 | $0.13 |

| ACQUISITION SESSION: AS-001 | | 605 |
|---|---|---|
| DATE AND TIME: 8/26/97, 11:14 AM | | 610 |
| RETAILER: RT-01 | | 615 |
| PRICING SESSION: PS-001 | | 620 |
| PRODUCTS ACQUIRED | QUANTITIES | |
| P-0554 | 1 | |
| P-0106 | 1 | |

FIG. 7

PROCESS AND PRODUCT FOR ENFORCING PURCHASE AGREEMENTS

CROSS-REFERENCE TO RELATED APPLICATIONS

This application claims the benefit of provisional patent application Serial No. 60/276,199, filed Mar. 15, 2001, entitled "SYSTEMS AND METHODS FOR ADJUSTING A REBATE AMOUNT BASED ON A DIFFERENTIAL BETWEEN A SET OF PRICED PRODUCTS AND A SET OF ACQUIRED PRODUCTS", the content of which is incorporated by reference herein for all purposes.

This application is related to the following co-pending U.S. Patent Applications:

U.S. patent application Ser. No. 10/100684 entitled "METHOD AND APPARATUS FOR PROMOTING A PRODUCT", filed concurrently herewith;

U.S. patent application Ser. No. 10/100,565 entitled "PROCESS AND PRODUCT FOR PROMOTING A PRODUCT", filed concurrently herewith:

U.S. Patent application Ser. No. 10/100,563 entitled "METHOD AND APPARATUS FOR PRODUCT DISPLAY", filed concurrently herewith;

U.S. patent application Ser. No. 09/609,598, entitled "SYSTEMS AND METHODS WHEREIN A BUYER PURCHASES PRODUCTS IN A PLURALITY OF PRODUCT CATEGORIES", filed Jun. 29, 2000;

U.S. patent application Ser. No. 08/889503, entitled "SYSTEMS AND METHODS WHEREIN A BUYER PURCHASES A PRODUCT AT A FIRST PRICE AND ACQUIRES THE PRODUCT FROM A MERCHANT THAT OFFERS THE PRODUCT FOR SALE AT A SECOND PRICE", filed Jul. 8, 1997 and issued as U.S. Pat. No. 6,249,772 on Jun. 19, 2001;

U.S. patent application Ser. No. 09/591594, entitled "SYSTEMS AND METHODS WHEREIN A BUYER PURCHASES A PRODUCT AT A FIRST PRICE AND PHYSICALLY ACQUIRES THE PRODUCT AT A LOCATION ASSOCIATED WITH A MERCHANT THAT OFFERS THE PRODUCT FOR SALE AT A SECOND PRICE", filed Jun. 29, 2000;

U.S. patent application Ser. No. 09/348566, entitled "SETTLEMENT SYSTEMS AND METHODS WHEREIN A BUYER TAKES POSSESSION AT A RETAILER OF A PRODUCT PURCHASED USING A COMMUNICATION NETWORK", filed Jul. 7, 1999;

U.S. patent application Ser. No. 09/388723, entitled "REDEMPTION SYSTEMS AND METHODS WHEREIN A BUYER TAKES POSSESSION AT A RETAILER OF A PRODUCT PURCHASED USING A COMMUNICATION NETWORK", filed Sep. 2, 1999;

U.S. patent application Ser. No. 09/337906, entitled "PURCHASING SYSTEMS AND METHODS WHEREIN A BUYER TAKES POSSESSION AT A RETAILER OF A PRODUCT PURCHASED USING A COMMUNICATION NETWORK", filed Jun. 22, 1999;

U.S. patent application Ser. No. 09/370291, entitled "SUPPLEMENTAL OFFERS WHEREIN A BUYER TAKES POSSESSION AT A RETAILER OF A PRIMARY PRODUCT PURCHASED THROUGH A PURCHASING SYSTEM", filed Aug. 9, 1999;

U.S. patent application Ser. No. 09/412930, entitled "METHODS AND APPARATUS WHEREIN A BUYER ARRANGES TO PURCHASE A FIRST PRODUCT USING A COMMUNICATION NETWORK AND SUBSEQUENTLY TAKES POSSESSION OF A SUBSTITUTE PRODUCT AT A RETAILER", filed Oct. 5, 1999; and U.S. patent application Ser. No. 09/540035, entitled "RETAIL SYSTEM FOR SELLING PRODUCTS BASED ON A FLEXIBLE PRODUCT DESCRIPTION"", filed Mar. 31, 2000.

The content of each of the above is incorporated by reference herein for all purposes.

BACKGROUND OF THE INVENTION

A customer may establish online a buyer price for one or more products, and then pick up those products during a subsequent transaction at a retailer. In return for establishing a buyer price online, the customer receives or is entitled to receive a benefit such as a rebate or discounted price on the product(s).

Many times, the set of products for which a buyer price is established online differs from the set of products picked up at the retailer.

Few systems exist for recognizing this difference.

DETAILED DESCRIPTION OF THE INVENTION

Applicants have recognized that, in some situations, it can be advantageous to employ information regarding products for which a buyer price has been established online.

Applicants have also recognized that, in some situations, it can be advantageous to employ information regarding the difference between (i) products for which a buyer price has been established online; and (ii) products actually received.

Applicants have also recognized that, in some situations, it can be advantageous to minimize the difference between products priced online and products actually received.

Applicants have recognized that one of many possible use of such information is to output offers which are based on such information.

According to an embodiment of the present invention, a product may be priced by way of receiving, from a customer, information defining one or more group(s) of comparable products the consumer is willing to purchase from, the information further including a price the customer is willing to pay. The buyer-defined price may be provided in exchange for individual products from within the group, or for the group itself.

For example, the on-line pricing system may transmit a redemption code to the customer device, entitling the customer to take delivery of one or more product(s) from a retailer local to the customer.

Upon taking delivery of the previously priced product(s), the customer device may communicate information related to the product(s) (e.g. one or more product identifier(s)) to the applicable retailer system. According to some embodiments of the present invention, rather than providing information related to the specific products having been taken delivery of, the customer or customer device may simply provide the previously received redemption code to the retailer system.

A detailed discussion of manners in which a redemption code may be assigned, issued and redeemed, as well as other methods related to the process of establishing a price for products and then acquiring products from a retailer, is provided in the following:

U.S. patent application Ser. No. 09/609,598, entitled "SYSTEMS AND METHODS WHEREIN A BUYER PURCHASES PRODUCTS IN A PLURALITY OF PRODUCT CATEGORIES", filed Jun. 29, 2000;

U.S. patent application Ser. No. 08/889503, entitled "SYSTEMS AND METHODS WHEREIN A BUYER PURCHASES A PRODUCT AT A FIRST PRICE AND ACQUIRES THE PRODUCT FROM A MERCHANT THAT OFFERS THE PRODUCT FOR SALE AT A SECOND PRICE", filed Jul. 8, 1997 and issued as U.S. Pat. No. 6,249,772 on Jun. 19, 2001;

U.S. patent application Ser. No. 09/591594, entitled "SYSTEMS AND METHODS WHEREIN A BUYER PURCHASES A PRODUCT AT A FIRST PRICE AND PHYSICALLY ACQUIRES THE PRODUCT AT A LOCATION ASSOCIATED WITH A MERCHANT THAT OFFERS THE PRODUCT FOR SALE AT A SECOND PRICE", filed Jun. 29, 2000;

U.S. patent application Ser. No. 09/348566, entitled "SETTLEMENT SYSTEMS AND METHODS WHEREIN A BUYER TAKES POSSESSION AT A RETAILER OF A PRODUCT PURCHASED USING A COMMUNICATION NETWORK", filed Jul. 7, 1999;

U.S. patent application Ser. No. 09/388723, entitled "REDEMPTION SYSTEMS AND METHODS WHEREIN A BUYER TAKES POSSESSION AT A RETAILER OF A PRODUCT PURCHASED USING A COMMUNICATION NETWORK", filed Sep. 2, 1999;

U.S. patent application Ser. No. 09/337906, entitled "PURCHASING SYSTEMS AND METHODS WHEREIN A BUYER TAKES POSSESSION AT A RETAILER OF A PRODUCT PURCHASED USING A COMMUNICATION NETWORK", filed Jun. 22, 1999;

U.S. patent application Ser. No. 09/370291, entitled "SUPPLEMENTAL OFFERS WHEREIN A BUYER TAKES POSSESSION AT A RETAILER OF A PRIMARY PRODUCT PURCHASED THROUGH A PURCHASING SYSTEM", filed Aug. 9, 1999;

U.S. patent application Ser. No. 09/412930, entitled "METHODS AND APPARATUS WHEREIN A BUYER ARRANGES TO PURCHASE A FIRST PRODUCT USING A COMMUNICATION NETWORK AND SUBSEQUENTLY TAKES POSSESSION OF A SUBSTITUTE PRODUCT AT A RETAILER", filed Oct. 5, 1999; and U.S. patent application Ser. No. 09/540035, entitled "RETAIL SYSTEM FOR SELLING PRODUCTS BASED ON A FLEXIBLE PRODUCT DESCRIPTION"", filed Mar. 31, 2000.

According to another embodiment of the invention, products may be priced by way of receiving, from a consumer, information defining one or more types or categories of comparable products the consumer is willing to purchase from. Thereafter, the system may select one or more products from the group as well as arrange for the consumer to receive an offer for a rebate or other benefit based on the selected product(s).

According to one embodiment of the present system, the differential between a set of products priced on-line and a set of products subsequently taken delivery of from a retail store may be used to assess a penalty against the customer, in the form of a charge to their financial account (e.g., a credit card account) and/or rescission of a previous benefit (rescission of a previously granted rebate).

By acknowledging the differential between a set of products priced on-line and a set of products subsequently acquired from a physical retailer, an Internet-based pricing system may be better suited to facilitate compliance with its various policies and procedures imposed on customers.

These and other embodiments are described herein.

System

Figure 1A:
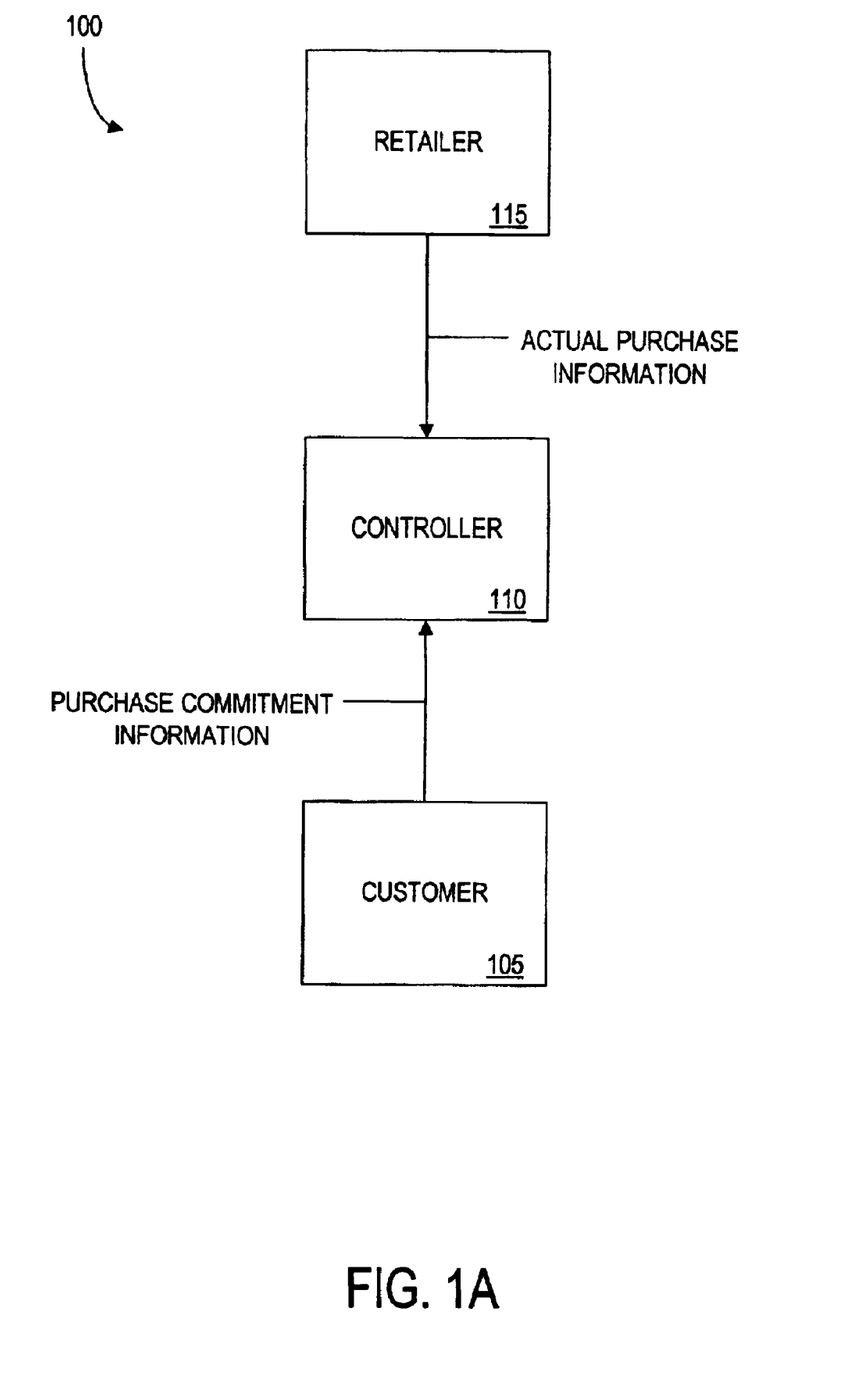
FIG. 1A is a block diagram of an embodiment of a system consistent with the present invention.

Referring now to FIG. 1, an apparatus 100 according to an embodiment of the present invention includes a controller 110 that is in communication with one or more retailers 115 via a network such as the Internet (wired and/or wirelessly), via another network protocol, or via other means for communication as would be understood by those of ordinary skill in the art. Although only one retailer 115 is depicted in FIG. 1A, any number of retailers may be in communication with the controller 110.

The controller 110 also communicates with a customer 105 via a network such as the Internet (wired and/or wirelessly), via another network protocol, or via other means for communication as would be understood by those of ordinary skill in the art. Although only one customer 105 is depicted in FIG. 1A, any number of customers may be in communication with the controller 110.

The customer 105 and/or retailer 115 may comprise computers, such as those based on the Intel® Pentium® processor, that are adapted to communicate with the controller 110.

Communication with the controller 110 may be direct or indirect. For example, communication may be via the Internet through a Web site maintained by controller 110 on a remote server or via an on-line data network including commercial on-line service providers, bulletin board systems and the like. In some embodiments, the customer 105 and retailer 115 may communicate with controller 110 over radio frequency ("RF"), infrared ("IR"), cable TV, satellite links and the like, including combinations thereof.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The controller 110 may function as a "Web server" that generates Web pages (documents on the Web that typically include an HTML file and associated graphics and script files) that may be accessed via the Web and allows communication with the controller 110 in a manner known in the art. Those of skill in the art will understand that there are a variety of well-known ways for creating and operating Web pages, and accordingly a detailed description of such known processes is omitted here for clarity.

Any or all of the customer 105, the controller 110 and retailer 115 may comprise, e.g., a conventional personal computer, a portable type of computer, such as a laptop computer, a palm-top computer, a hand-held computer, or a Personal Digital Assistant (PDA), or combinations thereof.

Figure 1B:
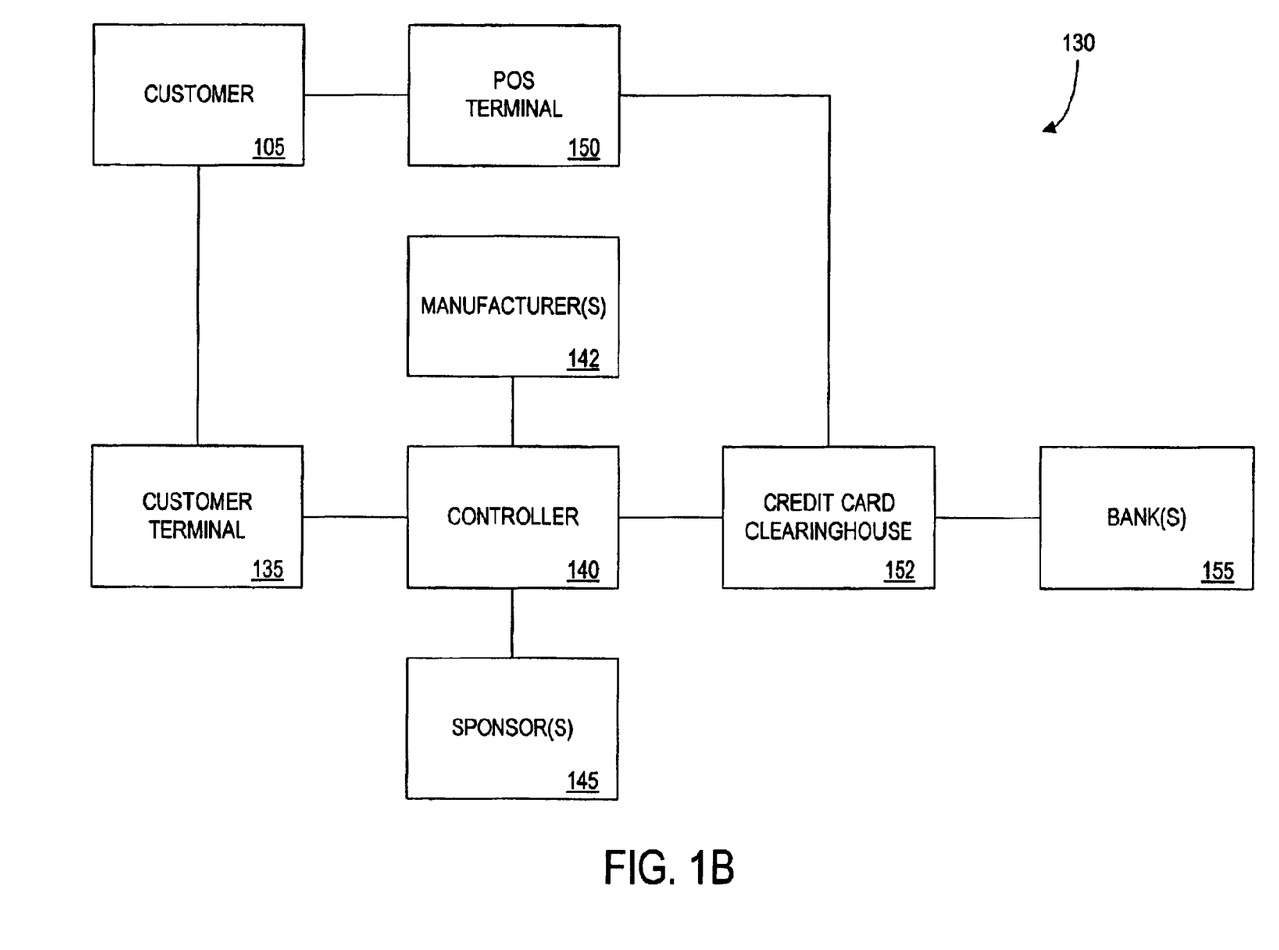
FIG. 1B is a block diagram of another embodiment of a system consistent with the present invention.

Referring to FIG. 1B, an apparatus 130 according to an embodiment of the present invention includes a controller 140 that is in communication with one or more customer terminals 135, one or more manufacturers 142, one or more sponsors 145, and one or more credit card clearing houses 152. Communication with each may be via a network such as the Internet (wired and/or wirelessly), via another network protocol, or via other means for communication as would be understood by those of ordinary skill in the art. It is also possible that controller 140 will receive information directly or indirectly from a POS terminal 150, such as a cash register (e.g., mechanical or electronic). The POS terminal may include a bar code scanner, keypad, and/or any other input device for receiving information related to one or more products being acquired. The POS terminal may also comprise or include means for receiving the previously assigned redemption code, along with information related to the specific products having been taken delivery of (e.g. coded information such as bar codes, SKUs or other product descriptor(s)).

A customer 105 communicates with the customer terminal 135, which may include a web browser or other known user interface means. The customer 105 also communicates with the POS terminal 150. In typical situations, the customer 105 will not communicate with the customer terminal 135 and the POS terminal 150 simultaneously.

As is known in the art, the credit card clearinghouse 152 communicates with one or more banks 155 as well as with the one or more POS terminals 150 to effectuate the processing of transactions made using a credit card account. For example, the credit card clearinghouse 152 may receive from the POS terminal a request to authorize a purchase for which a credit card account is to be charged for payment. The credit card clearinghouse 152 in turn responds to the request, typically to either authorize or deny the request. Via communication with the credit card clearinghouse 152, the controller 140 may likewise effectuate processing of credit card transactions via its communication with the credit card clearinghouse 152.

The manufacturers 142 can communicate with the controller 140 to, e.g., communicate desired prices, promotions and other product and pricing information to controller. It will be understood by those of ordinary skill in the art that, in addition to manufacturers, other product suppliers or sellers such as retailers, wholesalers and the like may communicate in a like manner with the controller 140.

The sponsors 145 include merchants willing to provide a benefit to the controller, manufacturer, customer, retailer and/or other parties in exchange for, e.g., advertising to the customer, acquisition of the customer as a client of the sponsor, other interaction with the customer.

Figure 1C:
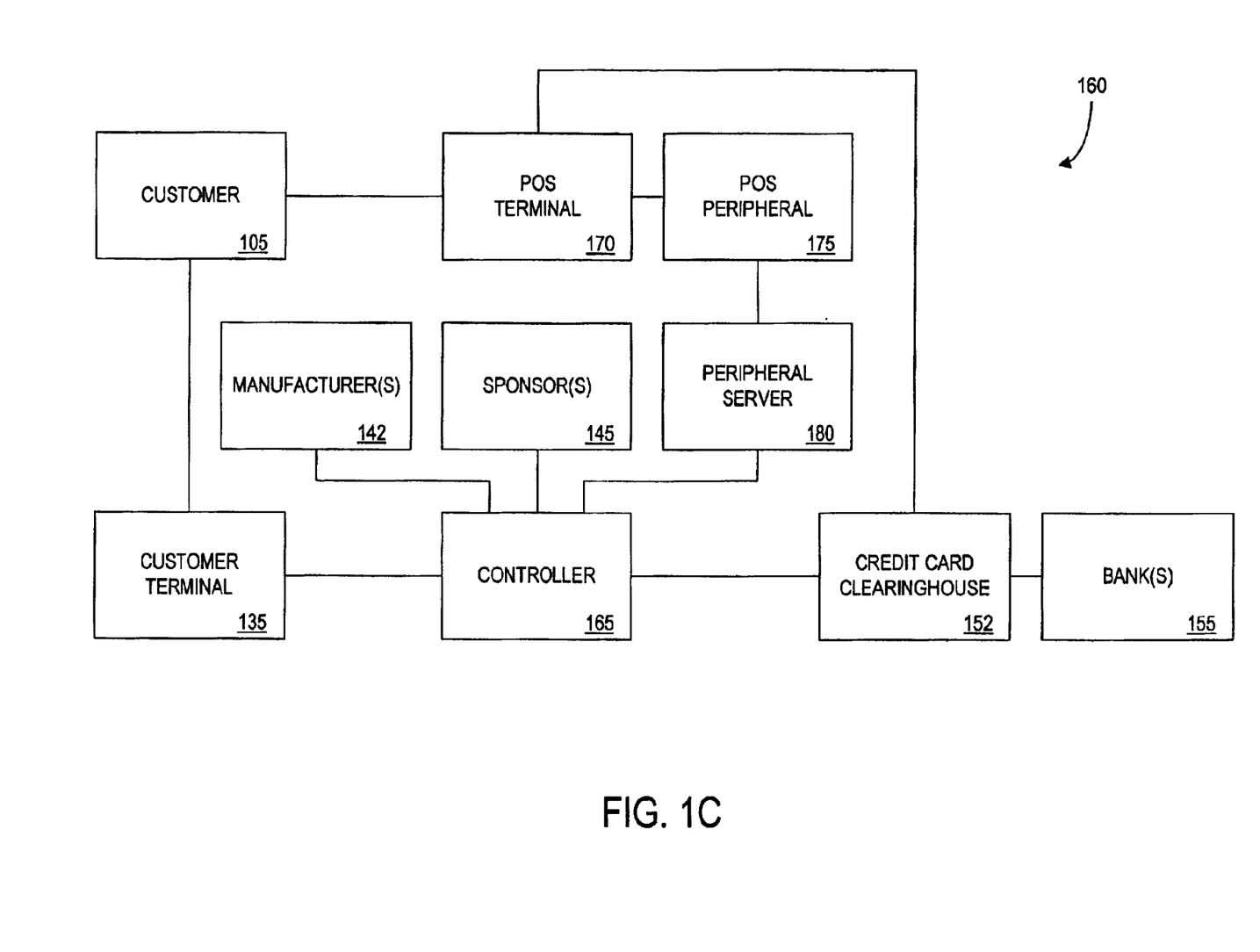
FIG. 1C is a block diagram of another embodiment of a system consistent with the present invention.

Referring to FIG. 1C, an apparatus 160 according to an embodiment of the present invention includes a controller 165 that is in communication with one or more customer terminals 135, one or more manufacturers 142, one or more sponsors 145, and one or more credit card clearing houses 152. Communication with each may be via a network such as the Internet (wired and/or wirelessly), via another network protocol, or via other means for communication as would be understood by those of ordinary skill in the art.

It is also possible that controller 165 will receive information directly or indirectly from a POS terminal 170, via a POS peripheral 175 and a peripheral server 180. The POS terminal 170 may be a cash register (e.g., mechanical or electronic). The POS peripheral 175 may be a device that receives information from the POS terminal 170, such as a coupon printer of the type manufactured by Catalina Marketing Corporation. The peripheral server 180 may be in communication with a plurality of such POS peripherals, thereby allowing the peripheral server 180 to receive information regarding a plurality of transactions at a plurality of retailers.

The POS peripheral 175 may be operable to access a database (e.g., of peripheral server 180) to issue custom coupons, offers, incentives and messages based upon the transaction. The peripheral server 180 may thus monitor shopper purchase history over time by associating purchase behavior with customer identifiers, such as loyalty card or check cashing card numbers. Further, this information may be analyzed, e.g., to identify those customers which a particular retailer should find most desirable. Based upon retailer objectives, the peripheral server 180 may direct the appropriate POS peripheral 175 to issue customized messages to specific shoppers that are relevant to their shopping behaviors.

Information received by the POS peripheral 175 from the POS terminal 170 may include transaction data such as products purchased, prices of products purchased, coupons redeemed, and time and date of transaction.

A customer 105 communicates with the customer terminal 135, which may include a web browser or other known user interface means. The customer 105 also communicates with the POS terminal 170. In typical situations, the customer 105 will not communicate with the customer terminal 135 and the POS terminal 150 simultaneously.

As is known in the art, the credit card clearinghouse 152 communicates with one or more banks 155 as well as with the one or more POS terminals 150 to effectuate the processing of transactions made using a credit card account. For example, the credit card clearinghouse 152 may receive from the POS terminal a request to authorize a purchase for which a credit card account is to be charged for payment. The credit card clearinghouse 152 in turn responds to the request, typically to either authorize or deny the request. Via communication with the credit card clearinghouse 152, the controller 165 may likewise effectuate processing of credit card transactions via its communication with the credit card clearinghouse 152.

The manufacturers 142 can communicate with the controller 165 to, e.g., communicate desired prices, promotions and other product and pricing information to controller. It will be understood by those of ordinary skill in the art that, in addition to manufacturers, other product suppliers or sellers such as retailers, wholesalers and the like may communicate in a like manner with the controller 165.

The sponsors 145 include merchants willing to provide a benefit to the controller, manufacturer, customer, retailer and/or other parties in exchange for, e.g., advertising to the customer, acquisition of the customer as a client of the sponsor, other interaction with the customer.

In addition to the description above, other means for the controller to receive information regarding a set of products for which a buyer price is established online, and a corresponding set of products picked up at the retailer.

Devices

Figure 2:
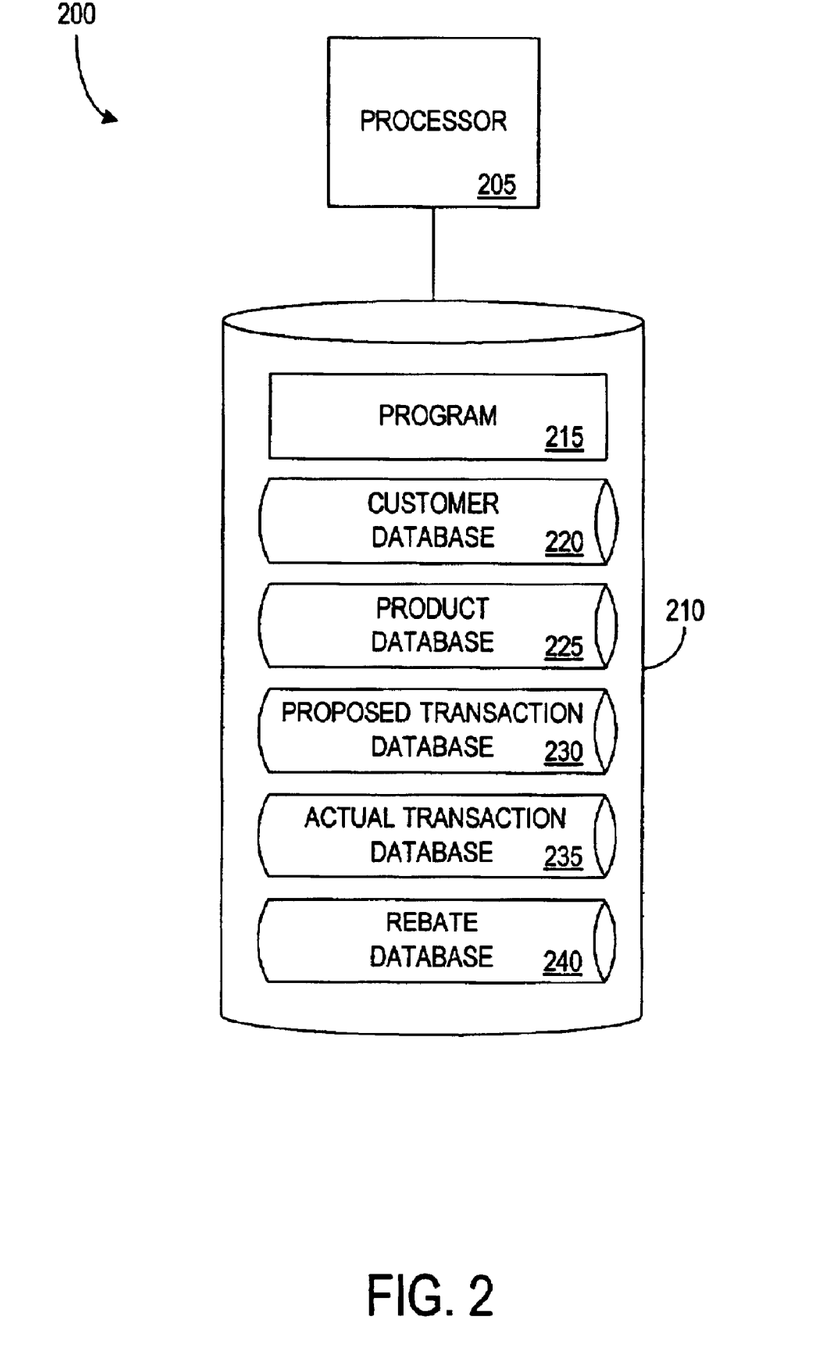
FIG. 2 is a block diagram of one embodiment of a controller.

FIG. 2 illustrates an embodiment 200 of a controller. The controller may be implemented as a system controller, a dedicated hardware circuit, an appropriately programmed general purpose computer, or any other equivalent electronic, mechanical or electromechanical device.

The controller 200 comprises a processor 205, such as one or more Intel® Pentium® processors. As is well known in the art, the processor 205 may be in communication with a communication port (not shown in FIG. 2) or other means for facilitating communication between the processor 205 and other devices.

The processor 205 is also in communication with a data storage device 210. The data storage device 210 comprises an appropriate combination of magnetic, optical and/or semiconductor memory, and may include, for example, Random Access Memory (RAM), Read-Only Memory (ROM), a compact disc and/or a hard disk. The processor 205 and the storage device 210 may each be, for example: (i) located entirely within a single computer or other computing device; or (ii) connected to each other by a remote communication medium, such as a serial port cable, telephone line or radio frequency transceiver or other wired or wireless media. In one embodiment, the controller may comprise one or more computers that are connected to a remote server computer for maintaining databases.

The data storage device 210 stores a program 215 for controlling the processor 205. The processor 205 performs instructions of the program 215, and thereby operates in accordance with the embodiments of the present invention, and particularly in accordance with the methods described in detail herein. The program 215 may be stored in a compressed, uncompiled and/or encrypted format. The program 215 furthermore includes program elements that may be necessary, such as an operating system, a database management system and "device drivers" for allowing the processor 205 to interface with computer peripheral devices. Appropriate program elements are well known to those of ordinary skill in the art, and need not be described in detail herein.

According to an embodiment of the present invention, the instructions of the program 215 may be read into a main memory from another computer-readable medium, such from a ROM to RAM. Execution of sequences of the instructions in program 215 causes processor 205 to perform the process steps described herein. In alternative embodiments, hard-wired circuitry may be used in place of, or in combination with, software instructions for implementation of the processes of the present invention. Thus, embodiments of the present invention are not limited to any specific combination of hardware and software.

The storage device 210 also stores (i) a customer database 220, (ii) a product database 225, (iii) a proposed transaction database 230, (iv) an actual transaction database 235 and (v) a promotional offer database 240. The databases are described in detail below and depicted with exemplary entries in the accompanying figures. As will be understood by those skilled in the art, the schematic illustrations and accompanying descriptions of the databases presented herein are exemplary arrangements for stored representations of information. Many other arrangements may be employed besides those suggested by the tables shown. Similarly, the illustrated entries of the databases represent exemplary information only; those skilled in the art will understand that the number and content of the entries can be different from those illustrated herein.

Databases

Figure 3:
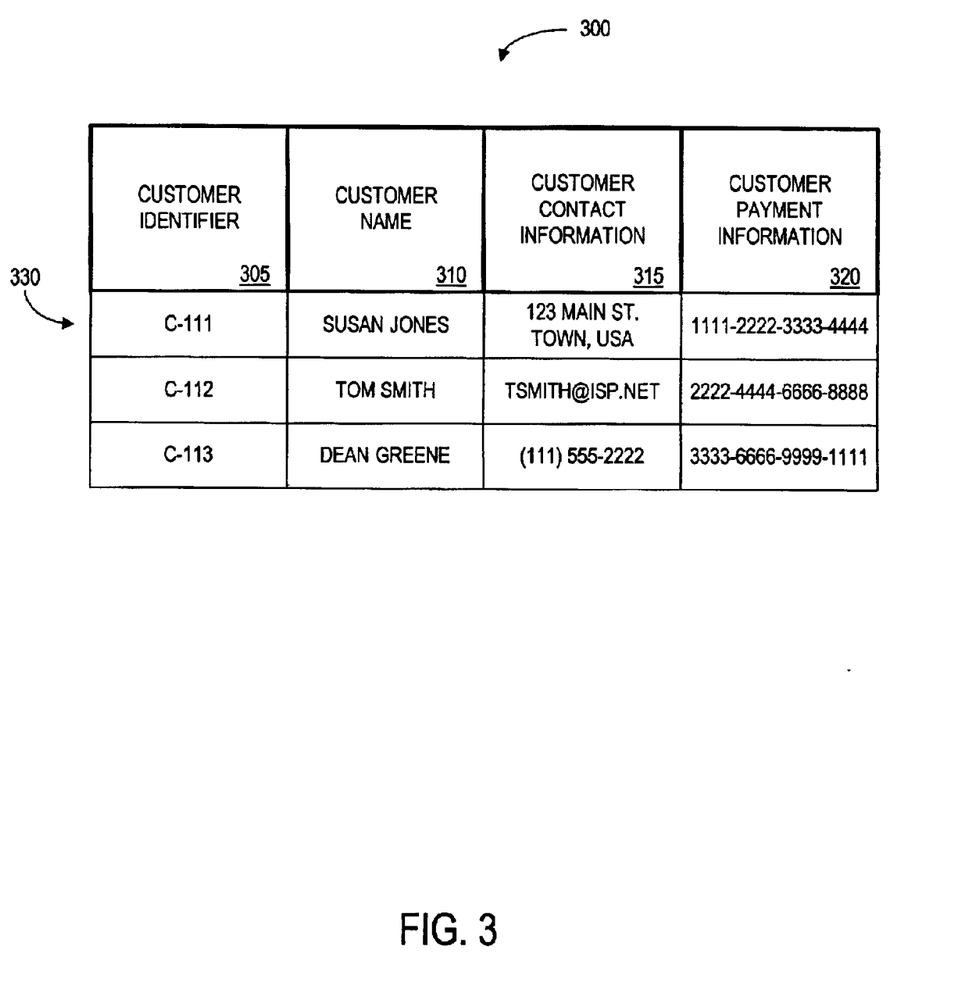
FIG. 3 is a table illustrating an exemplary data structure of a customer database.

FIG. 3 is a tabular representation of an embodiment 300 of the customer database. The tabular representation of the customer database includes a number of example records or entries, including the entry 330, each of which defines a customer. Those skilled in the art will understand that the customer database may include any number of entries. The tabular representation of customer database also defines fields for each of the entries or records. The fields specify: (i) a customer identifier 305 that uniquely identifies the customer; (ii) a customer name 310; (iii) contact information 315 of the customer; and (iv) payment information 320 of the customer, such as credit card or debit card account information which may be used to render payment on behalf of the customer.

The customer identifier, as well as other identifiers described herein, may be generated or assigned by the controller, or may be established by the customer and provided to the controller by way of a customer terminal or other appropriate device. For example, the customer identifier may comprise a numeric code that is assigned to the corresponding customer by the controller. Alternatively, the customer identifier may comprise a user name and/or password that may be generated by a customer terminal and subsequently provided to the controller.

The data stored in the contact information field may comprise any of (i) an electronic mail (e-mail) address, (ii) a postal address, (iii) telephone number, and (iv) a numeric IP address of the customer.

Figure 4:
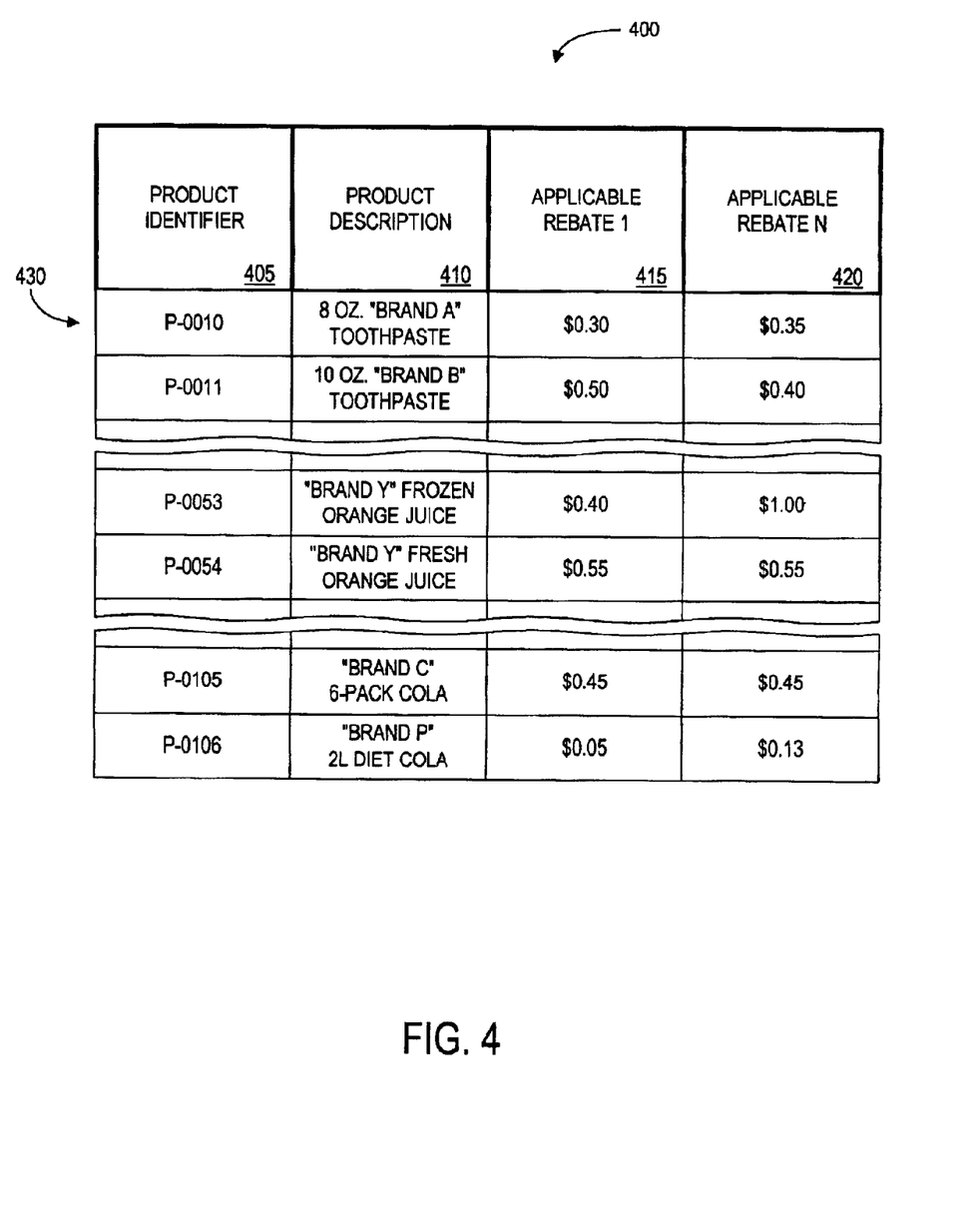
FIG. 4 is a table illustrating an exemplary data structure of a product database.

FIG. 4 is a tabular representation of an embodiment 400 of the product database. The tabular representation of the product database includes a number of example records or entries, including the entry 430, each of which defines a product offered for sale. Those skilled in the art will understand that the product database may include any number of entries, and that the information stored thereby may be specific to particular retailers. For example, the entry 430 may indicate a product offered for sale by, e.g., only a certain chain of stores, but not by others. Accordingly, the entries may optionally be associated with a retailer or set of retailers.

The tabular representation of product database also defines fields for each of the entries or records. The fields specify: (i) a product identifier 405 that uniquely identifies the product, such as an SKU or other appropriate identifier; (ii) a product description 410; and (iii) applicable rebates 415 and 420. Although two applicable rebates are illustrated in FIG. 4, any number of rebates may be used, and the number of rebates may differ among products in any manner desired.

Figure 5:
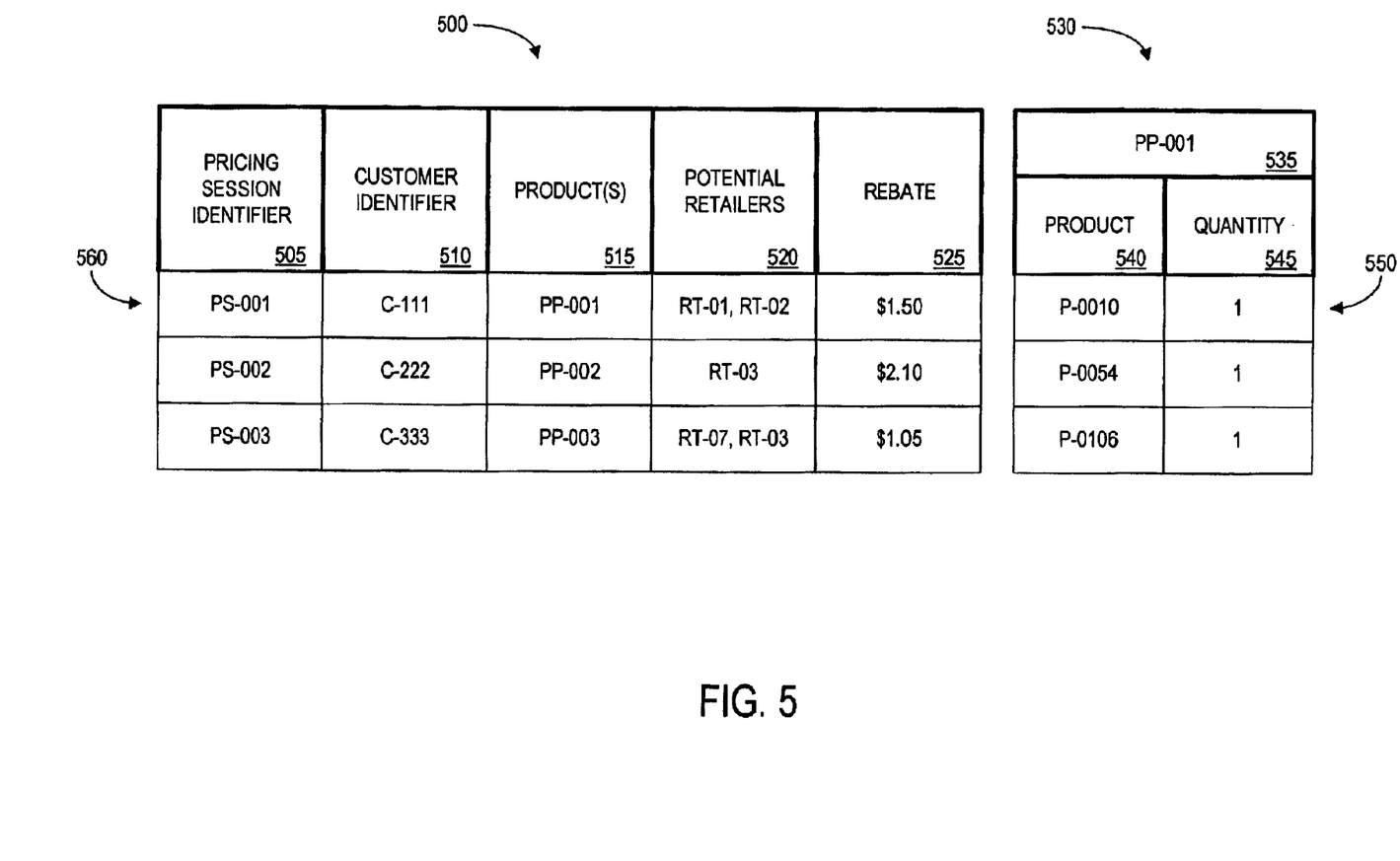
FIG. 5 is a table illustrating an exemplary data structure of a proposed transaction database.

FIG. 5 is a tabular representation of an embodiment 500 of the proposed transaction database. The tabular representation of the proposed transaction database includes a number of example records or entries, including the entry 560, each of which defines a proposed transaction in which a customer agrees to purchase one or more products. Those skilled in the art will understand that the proposed transaction database may include any number of entries.

The tabular representation of proposed transaction database also defines fields for each of the entries or records. The fields specify: (i) a pricing session identifier 505 that uniquely identifies the proposed transaction; (ii) a customer identifier 510 that identifies the customer agreeing to the proposed transaction; (iii) one or more products 515 which the customer agrees to purchase; (iv) potential retailers 520 at which the customer may pickup or otherwise acquire the products; (v) a rebate 525 which the customer receives.

The pricing session identifier may merely be the customer identifier. In such an embodiment, the customer identifier serves to identify the proposed transaction.

The products field 515 refers to one or more products, represented by the table 530. The table 530 indicates a unique products identifier 535 which corresponds to an entry of the products field 515. The table 530 further defines one or more entries, each entry defining a product 540 and a quantity 545. For example, the entry 550 indicates a product "P-0010" and a quantity of "1".

Figure 6:
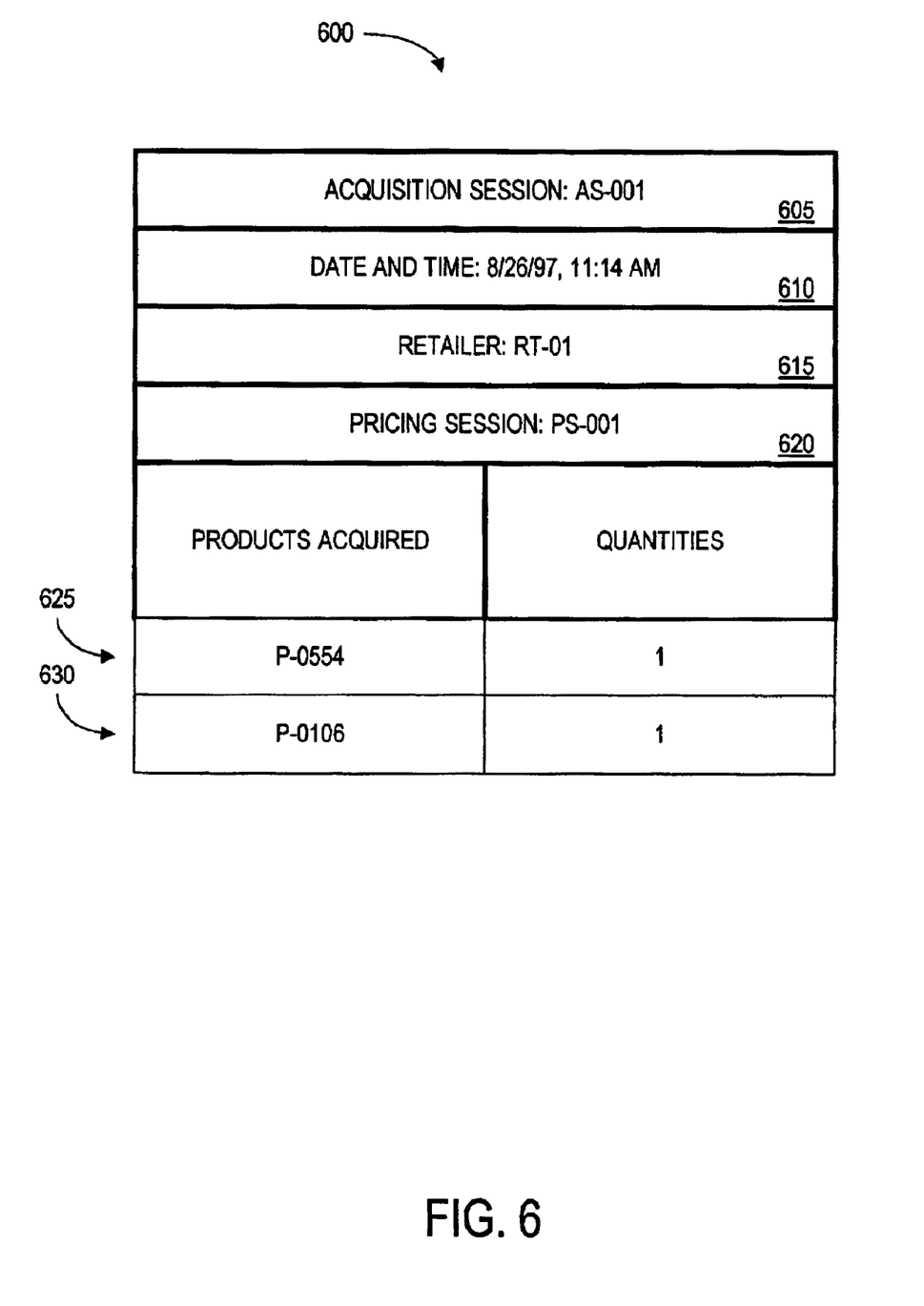
FIG. 6 is a table illustrating an exemplary data structure of an actual transaction database.

FIG. 6 is a tabular representation of a record 600 of an embodiment of the actual transaction database. The actual transaction database would typically contain a plurality of such records, each such record defining an actual transaction of a customer with a retailer. The tabular representation of the record 600 includes a number of example records or entries, including the entries 625 and 630, each of which defines a product and corresponding quantity acquired during the transaction. Those skilled in the art will understand that the record may include any number of entries. The tabular representation of customer database also defines fields for each of the entries or records.

The record further specifies: (i) an acquisition session identifier 605 that uniquely identifies the actual transaction; (ii) a date and time 610 of the transaction; (iii) a retailer 615 with which the transaction occurred; and (iv) a pricing session 620 which indicates the proposed transaction that the actual transaction was purported to correspond to.

Process Description

In accordance with the present invention, the controller may determine a first plurality of products which a buyer has agreed to purchase in exchange for a rebate or other favorable treatment. The agreement may be to purchase the products for a buyer price that is lower than a retail price of the first plurality of products.

Thereafter, the controller determines a second plurality of products which the buyer has actually received, e.g., by receiving from a retailer the transaction log indicating transactions with the retailer.

The controller may determine a first plurality of products which a buyer has agreed to purchase in exchange for a rebate, and also determine a second plurality of products which the buyer has actually received. If the second plurality of products does not include each product from the first plurality of products, the controller may charge a financial account of the buyer for a penalty amount. Typically, but not necessarily, this penalty amount is at least enough to eliminate the amount of a previously granted rebate (i.e. a reduction in the retail price).

The controller may establish an agreement with a customer to purchase one or more products for a buyer price during a future transaction. The buyer price is typically different than a retail price of the product(s), and may be lower than the retail price. The controller will determine whether, in the future transaction, the customer has neglected to purchase the product. If so, a financial account of the customer may be charged for a penalty amount.

The controller may establish a buyer price for a first plurality of products, wherein the buyer price is different than a retail price of the first plurality of products. The controller also charges a financial account for the buyer price, possibly after the products are received by the customer, or when the buyer price is established.

The controller also establishes a redemption code which identifies the buyer price and the first plurality of products. The code may be a customer specific identifier, such as a string of digits.

Thereafter, the financial account is charged for a penalty amount if the redemption code has been received in connection with a purchase that includes an additional product beyond the first plurality of products, and the additional product was not paid for.

Figure 7:
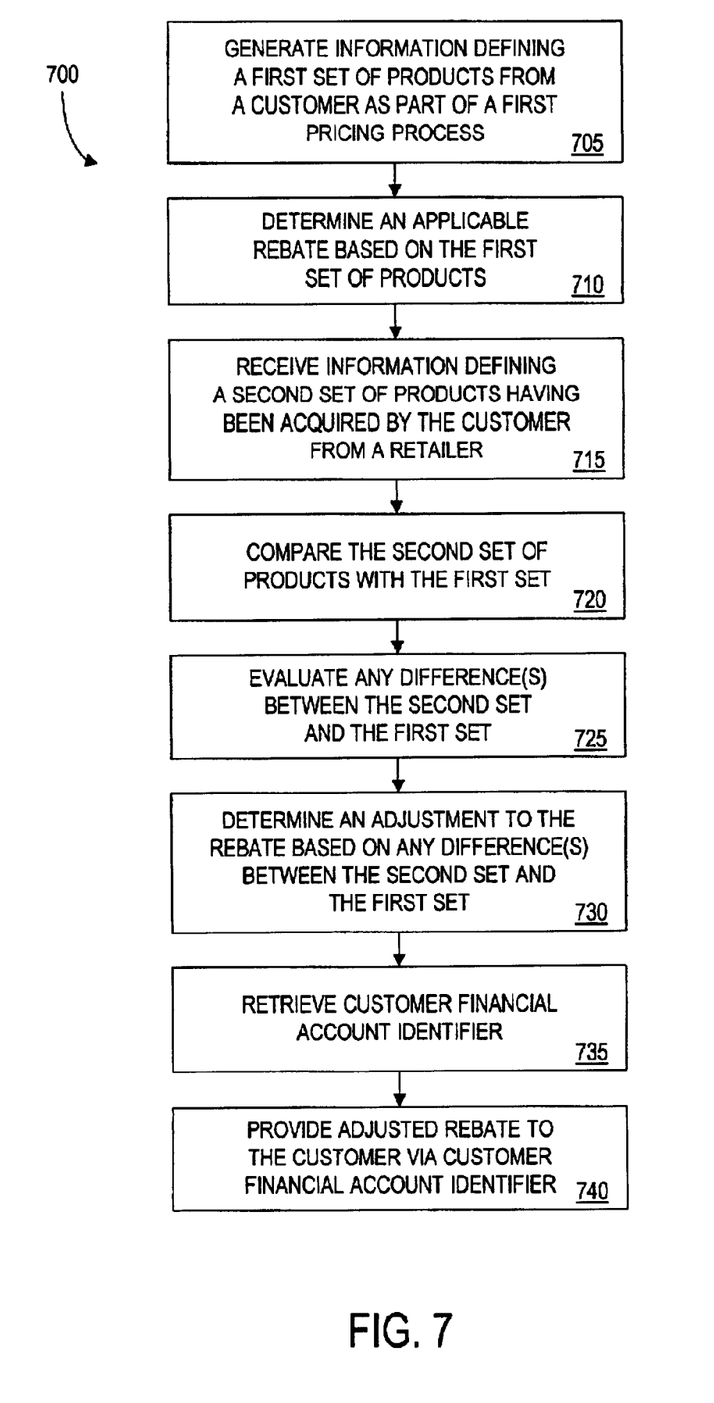
FIG. 7 is a flow diagram illustrating an exemplary process according to an embodiment of the present invention.

Referring to FIG. 7, at step 705 the controller generates or receives information defining a first set of products from a customer as part of a first pricing process.

At step 710, the controller determine an applicable rebate based on the first set of products.

At step 715, the controller receives information defining a second set of products having been acquired by the customer from a retailer.

At step 720, the controller compares the second set of products with the first set.

At step 725, the controller evaluates any difference(s) between the second set and the first set.

At step 730, the controller determines an adjustment to the rebate based on any difference(s) between the second set and the first set.

At step 735, the controller retrieves customer financial account identifier.

At step 740, the controller provides an adjusted rebate to the customer via customer financial account identifier.

Although the present invention has been described with respect to a preferred embodiment thereof, those skilled in the art will note that various substitutions may be made to those embodiments described herein without departing from the spirit and scope of the present invention.

For example, the customer may be rewarded for the correspondence between products priced and products received. Such benefits may include unanticipated rewards for certain behavior (e.g. a customer may unknowingly receive an offer for a free product if the customer purchases another particular product), sweepstakes, etc.

A customer may also receive increased rebates for certain behavior over time. The applicable rebate the customer may receive may change over time the more often the customer purchased the same product.

What is claimed is:

1. A method comprising:
   establishing a buyer price for a product, the buyer price being different than a retail price of the product;
   establishing a redemption code which identifies the buyer price and the product; and
   charging a financial account for the buyer price;
   charging the financial account for a penalty amount if the redemption code has been received in connection with a purchase that does not include the product.

2. The method of claim 1, in which the redemption code comprises:
   sixteen digits.

3. The method of claim 1, in which the redemption code comprises:
   a bar code.

4. A method comprising:
   establishing online a buyer price for a product, the buyer price being lower than a retail price of the product, the product to be picked up during a subsequent transaction at a retailer;
   establishing, before the transaction at the retailer, a redemption code which identifies the buyer price and the product;
   charging a credit card account for the buyer price; and charging the credit card account for a penalty amount if the redemption code has been received in connection with the transaction at the retailer, but the transaction does not include the product being picked up.

5. A method comprising:

establishing a buyer price for a number of units of a product, the buyer price being different than a retail price of the number of units of the product;

charging a financial account for the buyer price;

transmitting a redemption code which identifies the buyer price and the number of units of the product; and charging the financial account for a penalty amount if the redemption code has been received in connection with a purchase that does not include the number of units of the product.

6. The method of claim 5, in which the step of:

charging the financial account for a penalty amount if the redemption code has been received in connection with a purchase that does not include the number of units of the product comprises charging the financial account for a penalty amount if the redemption code has been received in connection with a purchase that includes a more than the number of units of the product.

7. A method comprising:

establishing a buyer price for a product,
the buyer price being different than a retail price of the product,
the product not including a second product;

charging a financial account for the buyer price;

transmitting a redemption code which identifies the buyer price and the product; and charging the financial account for a penalty amount if the redemption code has been received in connection with a purchase that includes the second product.

8. A method comprising:

establishing a buyer price for a product, the buyer price being different than a retail price of the product;

charging a financial account for the buyer price;

transmitting a redemption code which identifies the buyer price, the product and a retailer from which to take possession of the product; and charging the financial account for a penalty amount if the redemption code has been received in connection with a purchase not at the retailer.

9. A method comprising:

associating a first credit card account with a second credit card account;

establishing online a buyer price for a first plurality of products, the buyer price being different than a retail price of the first plurality of products;

setting a credit limit on the first credit card account to an amount based on the buyer price;

associating the first credit card account with the first plurality of products;

receiving data that represents a transaction at a retailer in which the first credit card account was used; and charging the second credit card account for a penalty amount if the transaction includes an additional product beyond the first plurality of products, which additional product was not paid for.

10. A method comprising:

associating a transaction identifier with a credit card account;

establishing online a buyer price for a first plurality of products, the buyer price being different than a retail price of the first plurality of products;

associating the transaction identifier with the first plurality of products and the buyer price;

transmitting the transaction identifier;

receiving data that represents a transaction at a retailer in which the transaction identifier was used; and charging the credit card account for a penalty amount if the transaction includes an additional product beyond the first plurality of products, which additional product was not paid for.

11. The method of claim 10, in which the step of receiving data that represents a transaction comprises:

receiving data that represents a plurality of transactions, each transaction including identifiers of products purchased and identifiers of coupons used; and selecting an identifier of a coupon used that matches.

12. An apparatus comprising:

means for determining a buyer price for a product, the buyer price being different than a detail price of the product;

means for determining a redemption code which identifies the buyer price and the product;

means for debiting a financial account for the buyer price; and means for debiting the financial account for a penalty amount if the redemption code has been received in connection with a purchase that does not include the product, wherein the means for debiting a financial account for the buyer price includes means for debiting the financial account for the retail price and means for crediting the financial account for a rebate amount.

13. An apparatus comprising:

means for determining online a buyer price for a product, the buyer price being lower than a retail price of the product, the product to be picked up during a subsequent transact ion at a retailer;

means for determining a redemption code before the transaction at the retailer which identifies the buyer price and the product;

means for debiting a credit card account for the buyer price; and means for debiting the credit card account for a penalty amount if the redemption code has been received in connection with the transaction at the retailer, but the transaction does not include the product being picked up, wherein the means for debiting a credit card account for the buyer price includes means for debiting the credit card account for the retail price and means for debiting the credit card account for a rebate amount.

14. An apparatus comprising:

means for determining a buyer price for a number of units of a product, the buyer price being different than a retail price of the number of units of the product;

means for debiting a financial account for the buyer price;

means for transmitting a redemption code which identities the buyer price and the number of units of the product; and means for debiting the financial account for a penalty amount if the redemption code has been received in connection with a purchase that does not include the number of units of the product, wherein means for debiting a financial account for the buyer price includes means for debiting the financial account for the retail price and means for debiting the financial account for a rebate amount.

15. An apparatus comprising:

means for determining a buyer price tar a product,
the buyer price being different than a retail price of the product,
the product not including a second product;

means for debiting a financial account for the buyer price;

means for transmitting a redemption code which identifies the buyer price and the product; and means for debiting the financial account for a penalty amount if the redemption code has been received in connection with a purchase that includes the second product, wherein means for debiting a financial account for the buyer price includes means for debiting the financial account for the retail price and means for crediting the financial account for a rebate amount.

16. An apparatus comprising:

means for determining a buyer price for a product, the buyer price being different than a retail price of the product;

means for debiting a financial account for the buyer price;

means for transmitting a redemption code which identifies the buyer price, the product and a retailer from which to take possession of the product: and means for debiting the financial account for a penalty amount if the redemption code has been received in connection with a purchase not at the retailer, wherein means for debiting a financial account for the buyer price includes means for debiting the financial account for the retail price and means for crediting the financial account for a rebate amount.

17. An apparatus comprising:

means for associating a first credit card account with a second credit card account;

means for determining online a buyer price for a first plurality of products, the buyer price being different than a retail price of the first plurality of products;

means for setting a credit limit on the first credit card account to an amount based on the buyer price;

means for associating the first credit card account with the first plurality of products;

means for receiving data that represents a transaction at a retailer in which the first credit card account was used; and means for debiting the second credit card account for a penalty amount if the transaction includes an additional product beyond the first plurality of products, which additional product as not paid for, wherein means for setting a credit limit on the first credit card account to an amount based on the buyer price includes means for setting the credit limit to at least the retail price less a rebate amount.

18. An apparatus comprising:

means for associating a transaction identifier with a credit card account;

means for determining online a buyer price for a first plurality of products, the buyer price being different than a retail price of the first plurality of products;

means for associating the transaction identifier with the first plurality of products and the buyer price;

means for transmitting the transaction identifier;

means for receiving data that represents a transaction at a retailer in which the transaction identifier was used; and means for debiting the credit card account for a penalty amount if the transaction includes an additional product beyond the first plurality of products, which additional product was not paid for, wherein means for determining online a buyer price for a first plurality of products price includes means for determining online a buyer price based on the retail price less a rebate amount.

* * * * *